United States Patent
Huang et al.

[11] Patent Number: 5,098,625
[45] Date of Patent: Mar. 24, 1992

[54] PROCESS FOR FORMING AN EXPANDED POROUS TETRAFLUOROETHYLENE POLYMER

[75] Inventors: James Huang; William Chou; David Chou, all of Taipei, Taiwan

[73] Assignee: Yeu Ming Tai Chemical Industrial Co., Ltd., Taipei, Taiwan

[21] Appl. No.: 628,322

[22] Filed: Dec. 17, 1990

Related U.S. Application Data

[63] Continuation of Ser. No. 323,529, Mar. 14, 1989, abandoned.

[51] Int. Cl.$^5$ .............. B29C 47/54; B29C 55/18
[52] U.S. Cl. ................ 264/127; 264/177.19; 264/210.6; 264/211.12; 264/288.8; 264/331.14; 425/DIG. 55
[58] Field of Search .......... 264/127, 175, 288.4, 264/177.19, 210.6, 210.7, 211.12, 288.8, 331.14, 177.17; 425/DIG. 55

[56] References Cited

U.S. PATENT DOCUMENTS

| | | | |
|---|---|---|---|
| 2,776,465 | 1/1957 | Smith | 264/127 |
| 2,951,047 | 8/1960 | Lantos | 264/127 |
| 3,260,774 | 7/1966 | Harlow | 264/127 |
| 3,389,201 | 6/1968 | Alsup et al. | 264/127 |
| 3,664,915 | 5/1972 | Gore | 264/127 |
| 3,953,566 | 4/1976 | Gore | 264/127 |
| 4,049,589 | 9/1977 | Sakane | 264/127 |
| 4,187,390 | 2/1980 | Gore | 264/288.4 |
| 4,760,102 | 7/1988 | Moriyama et al. | 264/127 |
| 4,826,725 | 5/1989 | Harlow | 264/127 |

OTHER PUBLICATIONS

"Fluon Polytetrafluoroethylene", Technical Service Note F 12/13, ICI, 1981.
"Fluorocarbon Polymers", Polymer Technology, pp. 357-370.
"Fluon Polytetrafluoroethylene", Technical Service Note F10, 4th edition, ICI, 1985.

*Primary Examiner*—Jeffery Thurlow
*Assistant Examiner*—Mathieu Vargot
*Attorney, Agent, or Firm*—Bell, Seltzer, Park & Gibson

[57] ABSTRACT

A process for preparing an improved expanded porous polytetrafluoroethylene product having a higher density and improved cold flow properties and prepared from a paste formed from a polytetrafluoroethylene resin and a lubricant. The method includes extruding the paste through an extrusion die at a reduction ratio of less than 100, calendering the extrudate, removing the lubricant, and heating the extrudate to a temperature greater than the crystalline melting point of polytetrafluoroethylene but generally below the temperature at which thermal decomposition becomes appreciable while concurrently expanding the extrudate to at least twice its original length.

19 Claims, 2 Drawing Sheets

PROCESS FOR FORMING AN EXPANDED POROUS TETRAFLUOROETHYLENE POLYMER

This application is a continuation of application Ser. No. 07/323,529, filed Mar. 14, 1989, now abandoned.

FIELD OF THE INVENTION

The present invention relates to tetrafluoroethylene polymers and in particular relates to a process for producing an improved expanded porous polytetrafluoroethylene.

BACKGROUND OF THE INVENTION

Polytetrafluoroethylene (PTFE) is the common designation given to fully fluorinated polymers which have the basic chemical formula $(-CF_2-CF_2-)_n$ and that contain 76 percent by weight fluorine. PTFE polymers are opaque solids having a white color and a crystalline melting point of about 327° C. PTFE is formed from tetrafluoroethylene monomer, $CF_2=CF_2$ which is a low boiling organic liquid (boiling point $-76.3°$ C. at 760 mm) which exists in the gas phase under normal polymerization conditions. As is well known to those familiar with PTFE, tetrafluoroethylene polymerizes readily at moderate temperatures and pressures (e.g. 60° C. and 5-25 atm) in the presence of free radical initiators.

As is further known by those familiar with PTFE materials, and to a great extent by the general public, PTFE possesses an outstanding combination of chemical and physical properties including excellent chemical resistance, stability at high temperatures, superior dielectric properties, good anti-frictional and "non-stick" properties and excellent resistance to degradation under typical outdoor weathering conditions.

A thorough discussion of polytetrafluoroethylene, its manufacture, fundamental properties, its fabrication into end products, and the respective properties of such products, is given in S. Sherratt "Polytetrafluoroethylene" (1966), Encyclopedia of Chemical Technology, Volume 9 (John Wiley & Sons, Inc.), the contents which are incorporated entirely herein by reference.

One of the desirable properties for certain end products of PTFE used in particular applications, is porosity. Porous PTFE products often have deformable and flexible properties which make them especially useful as a chemically inert sealing material when positioned between various mechanical parts. In general terms, PTFE is an excellent material for forming gaskets, pipe thread seals, and the like.

As is the case with many organic polymers, however, PTFE is not normally a porous material. Accordingly, a number of techniques have been devised for producing porous PTFE. One type of process for fabricating porous PTFE comprises adding a filler to the PTFE prior to forming the desired article and then removing the filler from the PTFE after the article is formed. The technique accordingly leaves behind void spaces which in turn give the end product the desired porosity. Typical fillers are leached out with solvents or melted out at elevated temperatures. In some cases polymers are used as fillers which are depolymerized and removed to produce the porous product. Such techniques can be somewhat complicated, however, and in cases where the solvent is not entirely removed, serious flaws can result in the end product.

More recently, and as set forth in U.S. Pat. Nos. 3,953,566 and 4,187,390 to Robert W. Gore (the "'566 patent" and the "'390 patent", respectively), a method of making porous PTFE can comprise a particular sequence of extruding, stretching, and then heating PTFE to form the desired product.

In this regard, the nature of PTFE is such that many normal techniques for manufacturing and handling polymers are inappropriate for manufacturing and handling PTFE. In particular, PTFE does not flow in the melt above its crystalline melting point of 327° C. As a result, typical melt flow techniques will not work with PTFE. Accordingly, PTFE must be processed in methods that are generally unconventional for polymers, but more closely resemble the techniques of powder metallurgy.

In a typical technique, PTFE is provided in the form of a "coagulated dispersion" which is then extruded to a desired shape and then sintered—i.e. heated somewhat above its melting point for a time sufficient for it to coalesce into an essentially impermeable material—to produce the resulting product. A thorough discussion of such processing techniques is set forth in "The Processing of PTFE Coagulated Dispersion Powders", pages 1-36, which is available from ICI Americas, Inc., Wilmington, DE 19897, and the contents of which are also entirely incorporated herein by references. Other handling techniques are set forth in "Health and Safety Aspects of Fluon Polytetrafluoroethylene", Technical Service Note F10, Fourth Edition, copyright Imperial Chemical Industries PLC 1985, which is also available from ICI Americas, Inc., Wilmington, DE 19897, and which is likewise incorporated entirely herein by reference.

As discussed in these references, PTFE coagulated dispersion ("CD") polymers are typically supplied as a fine, free flowing powder having an average bulk density of about 500 grams per liter and an average agglomerate size of between 450 and 500 microns. These dispersions are manufactured by coagulating an aqueous dispersion of PTFE. In order to extrude such dispersions, the coagulated dispersion polymers are blended with an "extrusion aid" or lubricant. A typical lubricant is a hydrocarbon having a desired vaporization temperature; examples are petroleum ether, naphtha, and low odor paraffin solvents. A number of such solvents, and the reasons for selecting a particular solvent are also discussed in the various references incorporated above. The general criteria for selecting a lubricant are well known and an appropriate lubricant for a particular manufacturing technique or end product can generally be selected without undue experimentation. Typically, lubricant is added in a proportion of about 15 to 25 percent of the total weight of the composition.

The dry-appearing mix of dispersion and lubricant is then lightly pressed into a billet or preform. Such preforms are stiff and brittle and similar in consistency to soft wax candles. The preform billet is then forced through the simple die of a constant rate ram extruder. The extrudate typically passes into a drying oven, the temperature of which is sufficient to vaporize the lubricant, and if desired, the extrudate is passed through another oven where it is sintered.

During extrusion the PTFE forms oriented fibers. These give the extrudate considerable longitudinal strength, but virtually no transverse strength.

The properties of the extrudate that results from these techniques will depend upon the combined effect of a number of variables. The most important of these include: the type of CD polymer; the reduction ratio; lubricant type and content; die cone angle; die parallel length; die temperature; and extrusion rate. Of these, the reduction ratio largely determines the amount of work done on the polymer, and in turn most significantly affects the properties of the extrudate. Reduction ratio can be defined in a number of ways, the simplest of which is the ratio of the cross sectional area of the extrusion cylinder to that of the die. The hardness or deformability of the extrudate is largely controlled by the work applied to the polymer during extrusion, and reduction ratio is a measure of such work. The more the polymer is worked the more fibrillated and harder it becomes, therefore, control of the reduction ratio will to a significant extent control the properties of the resulting product.

In the Gore '390 patent, porous PTFE is produced by extruding a paste resin at relatively high reduction ratios of at least 100, and usually much greater. The extrudate is then stretched at a relatively rapid rate, i.e. on the order of 100 percent per second or more. Subsequent to stretching, the stretched extrudate is sintered at temperatures above the crystalline melting point. The resulting product has a particular microscopic structure and a matrix tensile strength in at least one direction above about 7300 pounds per square inch (psi). The '390 and '566 patents, however, disclose that the increase in strength of a polymer matrix following sintering depends upon the strength of the extruded material prior to expansion (e.g. column 4, lines 32-36 of the '390 patent). Accordingly, the extrudates are worked at relatively high reduction ratios, (Example 1 discusses ratios of 370) to give the more fibrillated extrudate.

Although higher matrix strengths in porous PTFE products are advantageous in certain circumstances, lower strengths are advantageous in other circumstances. For example, porous PTFE products with lower matrix strengths are deformable under less force. As a result, gaskets made from such material can be appropriately tightened in place with less tightening force while still providing an excellent seal. Lower tightening forces can be advantageous in circumstances where the materials being joined are relatively fragile. For example, many pipes used for carrying various corrosive chemicals are formed of fiberglass or fiberglass reinforced plastic ("FRP"). When threaded or flanged together, such pipes cannot withstand the same tightening pressures that steel or galvanized iron pipes can withstand. In such circumstances, gasket material that is appropriately flexible under less force is desirable.

In forming porous PTFE products by carrying out the procedures in the '390 and '566 patents, both the rate of expansion and the temperature at which expansion takes place have to be controlled in a particularly sophisticated manner. Thus, in these techniques if a particular percent stretch is desired; e.g. 200 percent stretch; the strength and porosity of the resulting product will depend upon the rate at which the stretch takes place; e.g. 30% per second to 500% per second. Thus, the Gore techniques call for stretching the unsintered extrudate at a rate exceeding about 10% per second while the temperature is maintained below the crystalline melting point of the PTFE during the stretching step; i.e. the Gore techniques require that the extruded PTFE be stretched at temperatures below 327° C. More particularly, it has been more recently determined that a more characteristic description of the Gore technique is a rate of stretch of about 100% per second or higher. As further determined, the term "stretch rate" as used in the Gore patent and by those skilled in the art, refers to the percent of stretch divided by the time of stretching.

In manufacturing techniques, however, the careful control of such stretch rates and temperatures require the careful control of several different variables. Accordingly, if the process could be simplified somewhat, it would offer significant advantages in cost and technique. Additionally, as stated above, the high matrix tensile strength of the products in the '390 patent produced by the '566 method are not always satisfactory for applications in which a lower matrix tensile strength is desired For example, a lower matrix tensile strength, as well as a higher density, improves the cold flow or "creep" properties of porous PTFE in addition to the other advantages of lower matrix tensile strength set forth previously.

SUMMARY OF THE INVENTION

Accordingly, the invention comprises an improved process for preparing an improved expanded porous polytetrafluoroethylene product having a higher density, greater flexibility, and improved cold flow properties and prepared from a paste formed from a polytetrafluoroethylene resin and a lubricant. The method comprises extruding the paste through an extrusion die at a reduction ratio of less than 100, calendering the extrudate, removing the lubricant, and heating the extrudate to a temperature greater than the crystalline melting point of polytetrafluoroethylene but generally below its thermal decomposition temperature while concurrently expanding the extrudate to at least twice its original length. The expansion can be carried out at a constant rate so that only temperature need be controlled in order to control a number of properties of the resulting product.

The foregoing and other objects, advantages and features of the invention, and the manner in which the same are accomplished, will become more readily apparent upon consideration of the following detailed description of the invention taken in conjunction with the accompanying drawings, which illustrate preferred and exemplary embodiments, and wherein:

DETAILED DESCRIPTION OF THE PREFERRED EMBODIMENTS

The present invention comprises a process for preparing a porous polytetrafluoroethylene product. In the preferred embodiment, the invention is produced from a paste formed from a polytetrafluoroethylene resin and a lubricant. In particular, the PTFE resin is a coagulated dispersion product. As discussed in the Sherratt reference incorporated earlier herein, such a coagulated dispersion polymer is first prepared by polymerizing tetrafluoroethylene with an initiator and an emulsifier already present. The resulting dispersion contains PTFE particles and a solids content of about 40 percent by weight or 20 percent by volume. This dispersion is diluted and coagulated, then separated from the aqueous dispersion and dried. The resulting powder consists of agglomerates of colloidal particles which have an average size of between about 300 and 700 microns and an apparent density of about 350 to 600 grams per liter.

Figure 1:
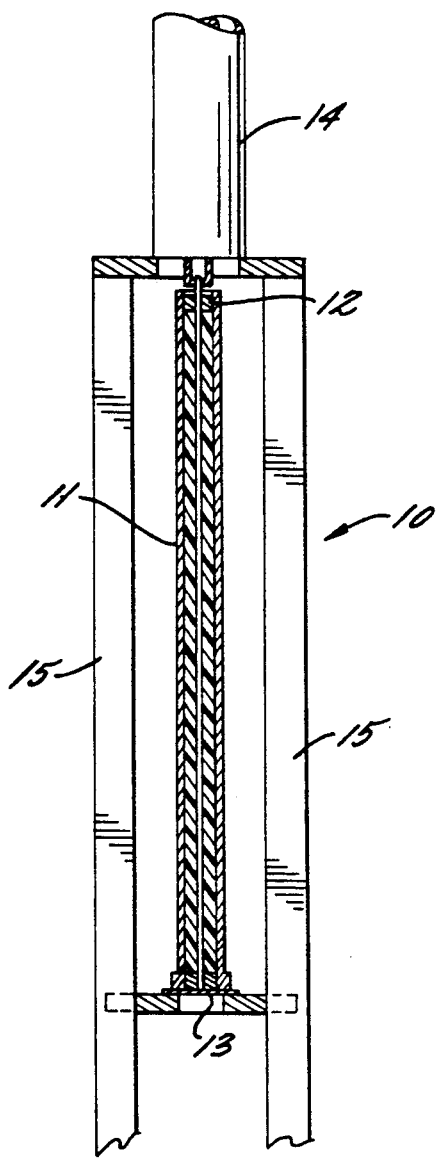
FIG. 1 is a cross-sectional side elevational view of preforming apparatus.

The coagulated dispersion polymer is then mixed with about 25 percent of its weight of a hydrocarbon lubricant and formed into a preform at relatively low pressures (about 500 psi) until the lubricant fills the voids in the mixture. FIG. 1 illustrates the relatively straightforward equipment used to fabricate the preform. The preforming device generally designated at 10 includes a cylindrical preforming tube 11, a ram 12, and a plate 13. Driving means such as a hydraulic cylinder 14 drive the ram, and the various elements are supported on the frame elements 15. In a typical production sequence, the preforming device 10 is used to compress the lubricated polymer to about one-third of its initial volume.

Figure 2:
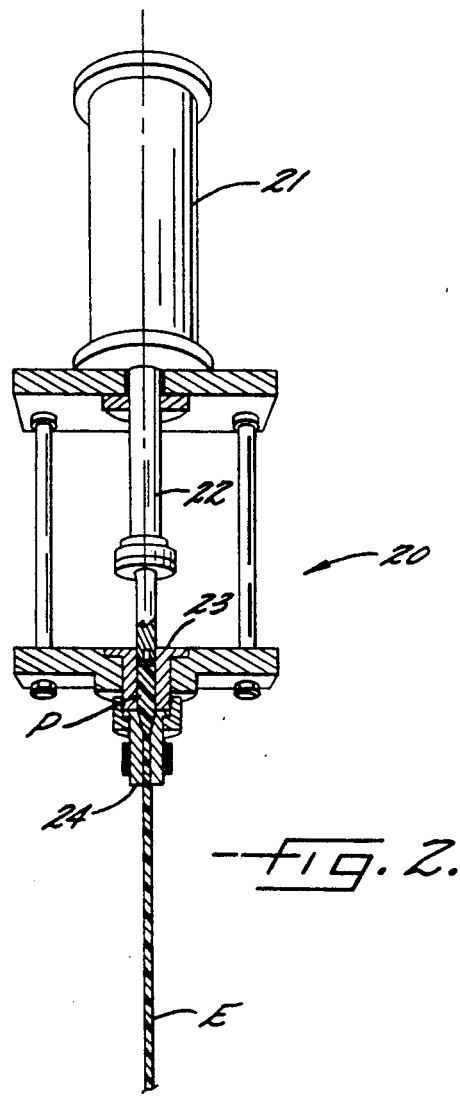
FIG. 2 is a partial cross-sectional view of a rod type extruder.

According to the invention, the resulting preform P is placed in a ram-extruder device 20 such as the one illustrated in FIG. 2. Device 20 includes a hydraulic drive unit 21, a piston or "ram" 22, an extruder cylinder or barrel 23, and a smaller cylinder that forms a die 24 in communication with the barrel 23. The preform P is placed in the barrel 23 and extruded through the die 24 at a reduction ratio of less than 100 to form the extrudate E, so that the extrudate E has a diameter somewhat smaller than that of the preform P. At the low reduction ratio, a certain amount of fibrillation takes place, but not nearly as much as takes place in the prior known processes. In order to increase the fibrillation of the extrudate to any particular desired extent, the extrudate is then calendered.

The difference in diameters between the preform P and the extrudate E represents the reduction ratio. The physical process of forcing the preform into the longer narrower shape orients the particles and in turn the molecules of PTFE. The hydraulic drive unit 21 develops the extensive pressures, which can range from up to 10-20 tons per square inch, that are used to produce the extrudate from the die. Appropriate machinery for such extrusion has been available for some time, and is familiar to those knowledgeable in this art. Some specific devices are set forth in the incorporated references, but do not form any of the boundary of the scope of the present invention. Typical ram extruders such as device 20 operate at a maximum speed of about 2 to 4 inches per minute. The ram 22 simply forces lubricated polymer through the orifice of the die 24.

Figure 4:
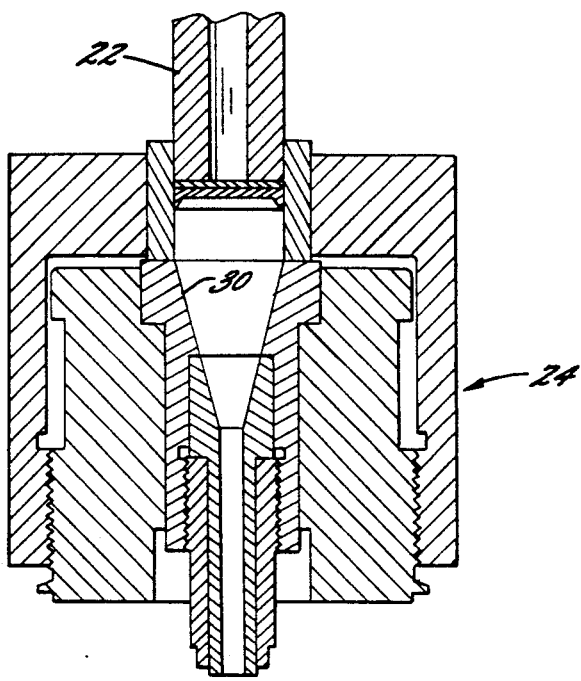
FIG. 4 is an enlarged cross-sectional view of an extruder die.

FIG. 4 is an enlarged view of the die 24 and illustrates that the portion of the extruder in which the size of the extrudate is reduced from that of the preform is generally conical in shape and is often referred to as the "cone", designated at 30 in FIG. 4. Typically an included angle of 30 degrees is common in such a cone although larger angles may be incorporated as desired to minimize the length of a die or to reduce the amount of materials which may be wasted in the cone 30.

FIG. 4 illustrates that the die 24 is formed of a number of structural parts that are typically threaded together in order to withstand the great pressures usually exerted upon and within the die during the extrusion process. These parts and their particular illustrated arrangement are illustrated for the sake of completeness and accuracy, but as they are relatively common and well understood to those familiar with extrusion processes, they have not been individually numbered and will not be described further herein.

Figure 5:
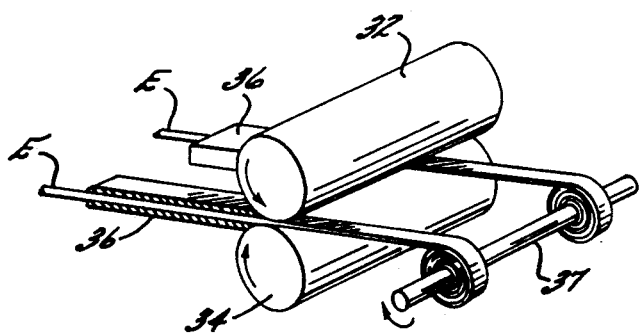
FIG. 5 is a schematic view of a calendering system.

The calendering step is schematically illustrated in FIG. 5 and likewise uses techniques familiar to those in the art. Specifically, the unsintered PTFE extrudate E is passed through narrowly adjacent rotating cylinders 32 and 34 which further orient the extrudate and the molecules therein. Typical calender rolls are made from a hard material such as chilled cast iron and are preferably chrome plated. Calender rolls may be heated and adjustable so that they can be maintained in accurate parallel orientation. Typically a calendering device for PTFE will have a variable speed drive of about 10 and 100 feet per minute. In FIG. 5, the generally cylindrical extrudate E is first directed through a "fish tail guide" 36 that prevents the extrudate from wandering during calendering, which would result in flaws in the resulting product. The calendered extrudate is typically wound on a spool 37 as further illustrated in FIG. 5.

Figure 6:
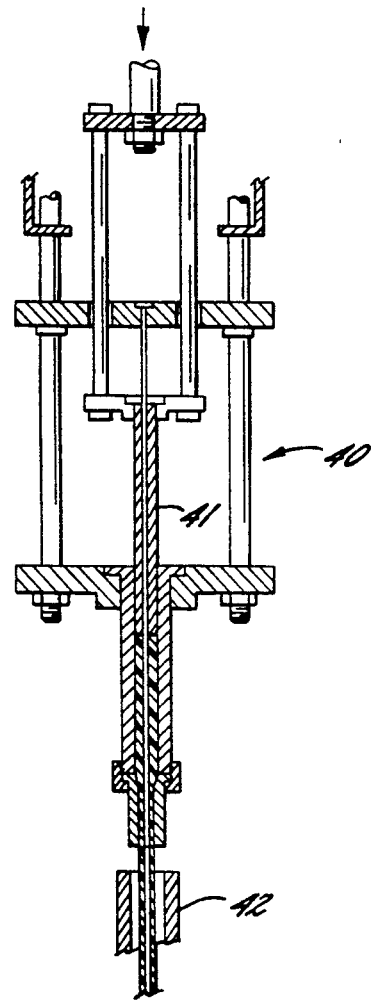
FIG. 6 is a cross-sectional view of an extruder for forming sintered tube.

Following calendering, the lubricant is removed from the extrudate. As set forth earlier, a number of relatively volatile organic substances are useful as lubricants including naphtha and petroleum ether. In other circumstances, less volatile lubricants such as low odor paraffin solvents or mineral oils are useful. The lubricant must be removed before the PTFE is raised above its melting point, otherwise the evaporation of lubricant during the sintering step will form physical defects in the solid polymer. The lubricant is typically removed by passing the extrudate through an electrically heated oven. FIG. 6 illustrates such an oven as part of a sintered tube type extrusion device 40. The tube-forming device 40 is in many ways substantially functionally identical to the extrusion device 20 illustrated in FIG. 2, but the tube device 40 also includes a core pin 41 around which the preform is extruded to form a tube T. After the extruded tube T exits the die 24, it passes through a drying oven 42. In the present invention, the step of removing the lubricant comprises heating the extrudate to a temperature of about 300° C. for a time period sufficient for the lubricant to substantially evaporate from the extrudate.

In the existing processes for producing porous PTFE, the dried extrudate would next be stretched, and following stretching, sintered in a sintering oven.

In contrast, in practicing the present invention, and following removal of the lubricant, the extrudate is heated to a temperature greater than the crystalline melting point of polytetrafluoroethylene, but generally below the temperature at which thermal decomposition becomes appreciable. At the same time the extrudate is expanded to at least twice its original length, and in the preferred embodiments is expanded to at least four times its original length.

Typically, heating the extrudate to a temperature above the crystalline melting point of polytetrafluoroethylene comprises heating the extrudate to a temperature greater than about 320° C., usually more than about 327° C., and in preferred embodiments the extrudate is heated to a temperature of between about 350° and 400° C.

The step of heating the extrudate while concurrently expanding it preferably takes place for a time period long enough to complete the expansion but short enough to prevent substantial decomposition of the polymer. Appropriate heating times and temperatures can be developed without undue experimentation for various desired products. In a preferred embodiment, the step of heating the extrudate to a temperature above the crystalline melting point while concurrently expanding it comprises heating the extrudate to a temperature of about 360° C. for a period of about 10 minutes.

In determining the upper limit of the temperature range during the heating step, a temperature should be selected at which the extrudate shows substantially no weight loss for a period of about one hour. It will be understood by those familiar with the technology that weight loss during heating is often an indication of degradation or decomposition of such a polymer so that the lack of substantial weight loss indicates that the polymer has remained stable during the process. In practicing the invention, such temperatures are typically no greater than about 430° C., preferably no more than about 400° C., and most preferably between about 350° C. and 400° C.

Figure 3:
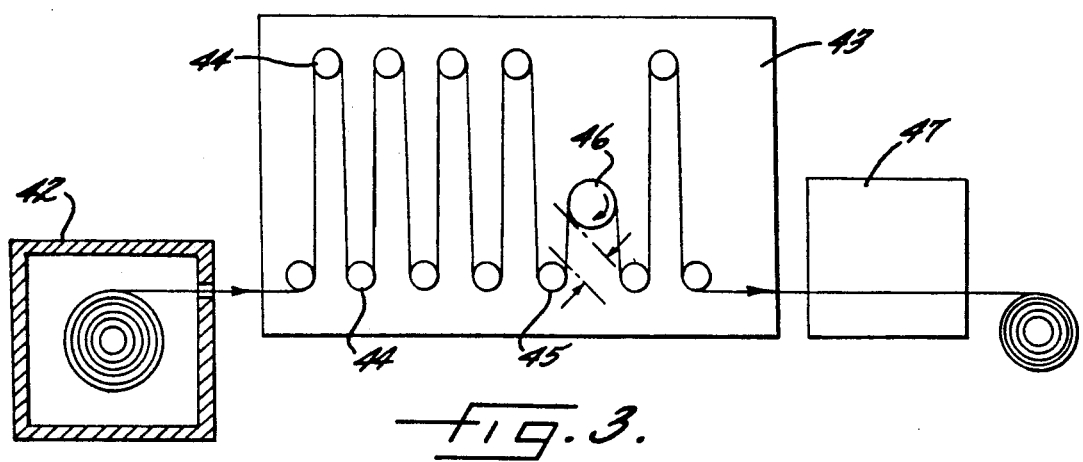
FIG. 3 is a schematic view of the drying oven and expansion oven used in accordance with the present invention.

In the preferred embodiment of the present invention, the stretching takes place inside an expansion oven 43 as set forth schematically in FIG. 3. As illustrated in FIG. 3, the extrudate E which is collected in another embodiment of the drying oven 42 from which it passes over a number of substantially identical rotating rolls or drums 44 in order to maintain it in the expansion oven for an appropriate period of time. In order to expand the extrudate while heating it above its crystalline melting point, rotating drum 46 is provided which has a diameter approximately twice that of the immediate proceeding drum which has been designated at 45. The two rotating drums 45 and 46 are operatively connected, for example by a gear chain (not shown), so that their relative rotation rates can be changed by means of different gears. Drum 46 can be driven faster than drum 45, so that the extrudate may be stretched in the gap A between the two drums. The gears can be changed to obtain the speed necessary to obtain the desired stretch. For example, when drum 46 is larger than drum 45, the linear speed along the circumference of drum 46 will be greater than that along the circumference of drum 45 simply because of the greater diameter of drum 46. Similarly, drum 46 can also be driven at a faster rotational speed than drum 45, adding to the difference in linear speeds and further increasing the degree of stretch. Following expansion, the extrudate E passes through a cooling zone 47 and is then collected, typically by being wound on a spool as further illustrated in FIG. 3.

Because the invention carries out the stretching step at a temperature above the crystalline melting point of PTFE, the porosity and other characteristics of the resulting product can be controlled by moderating the temperature within the range set forth above, rather than by controlling the rate of expansion as has been necessary in the prior techniques. In this regard, it has been unexpectedly discovered that while carrying out a fixed rate of expansion, a higher temperature within the given range results in a more highly sintered surface with a corresponding increase in strength, while a lower temperature within the preferred range produces a product having less sintered characteristics and a corresponding increase in its deformable character as its characteristics.

In a most preferred embodiment, the extrudate E passes through the expansion oven 43 in substantially continuous fashion. The temperature in the oven is accordingly moderated within the desired temperature range so that the temperature of the extrudate substantially equilibrates in the period during which the extrudate passes through the expansion oven. When the temperature so equilibrates, the entire product is more uniformly affected so that its resulting properties of strength and flexibility are likewise uniform throughout. For example, in producing a joint sealant with dimensions of about 3 millimeters (mm) in width and 1.5 mm in thickness, an oven temperature of about 350° C. is sufficient to equilibrate the temperature of the extrudate and produce a uniform product. Alternatively, in producing the same joint sealant with dimensions of about 20 mm in width and 7 mm in thickness, an oven temperature of about 400° C. is preferred.

As has been recognized for some time and described earlier herein, a PTFE preform is made up of a number of small particles which have coalesced into an essentially impermeable structure. The extrusion process tends to form fibrils or fibers between these particles. Using the techniques of the present invention, a porous PTFE product results which has a matrix tensile strength of between about 4,000 and 6,800 pounds per square inch, significantly lower than that of porous PTFE products formed according to previous techniques. As understood to those familiar with such terminology, the matrix tensile strength can be computed by dividing the maximum force required to break a porous (i.e. expanded or stretched) sample by its cross sectional area and then multiplying by the ratio of the specific gravity of the unstretched polymer to the specific gravity of the porous specimen.

The product formed according to the present invention also has a significantly higher density than other similar PTFE products, a density on the order of 0.45 to 0.55 grams per cubic centimeter (g/cm$^3$). The lower matrix tensile strength and the higher density give the resulting product improved cold flow or "creep" properties. The properties are particularly important in a number of applications for which the product is particularly suited, such as gasket material, oblong shapes, V-shapes, round shapes, filaments, yarns, tubing, sheets, foils, and films.

As is known to those familiar with the processing of PTFE, a number of different types of products can be produced using generally analogous techniques. For example, the present invention can be used to produce tape, often useful as joint doping where threaded pipe fittings are joined, flat cord which can be formed into relatively narrow gasket material, V-shapes, filaments, yarns, tubing, sheets, and forms having rectangular and square cross sections.

In this regard, the invention further comprises a method of sealing a joint against the passage of fluids through undesirable portions of the joint by applying the expanded porous polytetrafluoroethylene product of the present invention to at least one of the joinable surfaces of a joint. As set forth earlier herein, one of the advantages of the invention is its flexibility under smaller forces so that the product is deformable into a shape which complements the respective surfaces when the surfaces are joined together. By joining the joinable surfaces together with the expanded polytetrafluoroethylene product therebetween, a sealed joint is thereby formed which is substantially impermeable to liquids along the portions which have been sealed by the expanded porous polytetrafluoroethylene product.

The following examples are illustrative of the technique of the present invention and the resulting products.

EXAMPLE 1

Expansion of Sponge PFTE Tape

A lubricated tetrafluoroethylene polymer composition which contains approximately 80 percent polytetrafluoroethylene and 20 percent mineral oil was extruded at a reduction ratio of 56 and a pressure of 80 Kg/Cm$^2$ through a die 90 mm long and 20 mm in diameter. The extruded cylindrical rod was calendered to form a tape 110 millimeters (mm) wide and 4.2 mm thick. The oil was removed by heating the tape at approximately 300° C. The tape was then heated at 360° C. for 10 minutes while being drawn to four times its original length following extrusion. The resulting porous tape is 104 mm in width and 3.2 mm in thickness.

EXAMPLE 2

Manufacture of Continuous Lengths of Sponge PFTE Tape

A machine such as the one illustrated in FIG. 3 was constructed for manufacturing long lengths of expanded sponge PTFE tape. An extruded cylindrical rod similar to that described in Example 1 was calendered to form a tape. Then the tape was placed into the drying oven for the removal of the lubricant oil. The oven temperature was raised in incremental fashion until it reached 300° C., at which temperature the tape was maintained until dry. The tape was then removed from the drying oven and placed into the expansion oven where the temperatures were kept at 350°-400° C. In the oven, the tape was heated to above the crystalline melting point, and then expanded using adjacent rollers rotating at different speeds as set forth earlier herein. The expanded sponge tape was then removed from the expansion oven and put into the cooling zone where it was permitted to cool somewhat before being is wound for storage.

EXAMPLE 3

Expansion of Shaped Articles

A lubricated tetrafluoroethylene polymer composition containing approximately 80 percent polytetrafluoroethylene and 20 percent mineral oil was extruded at a reduction ratio of 88 and a pressure of 70 Kg/Cm$^2$ through a die 80 mm long and 8 mm in diameter. The extruded cylindrical rod was calendered to make a shaped article 11 mm wide and 5.7 mm thick. The oil was removed by heating the article at a temperature of approximately 300° C. The shaped article was then heated at 360° C. for 10 minutes while being drawn to four times its length following extrusion. The resulting shaped article was 10 mm wide and 4.2 mm thick.

EXAMPLE 4

Manufacture of Continuous Length of Shaped Articles

A machine such as the one illustrated in FIG. 3 was constructed to manufacture continuous lengths of expanded shaped articles. Following extrusion and calendering, the extrudate was shaped to a desired cross-sectional profile. The shaped extrudate was then placed in the drying oven at a temperature of about 300° C. in order to remove the lubricant. The shaped extrudate was then placed in the expansion oven in continuous fashion as described earlier herein. With the temperature of the expansion oven kept at between about 350° and 400° C., the shaped extrudate was heated and stretched by passing between two rotating drums, with the stretching drum having twice the diameter of the immediately preceding drum. The relative speeds of rotation of each drum were adjusted in order to obtain the desired degree of stretch for a specific product or application.

In the drawings and specification there have been disclosed typical preferred embodiments of the invention and although specific terms have been employed they have been used in a generic and descriptive sense only and not for purposes of limitation, the scope of the invention being set forth in the following claims.

That which we claim is:

1. A process for preparing an expanded porous polytetrafluoroethylene product having a higher density, greater flexibility, and a lower matrix tensile strength than conventionally extruded, stretched, and sintered polytetrafluoroethylene products, and for which the resulting properties can be varied while maintaining a constant rate of expansion during the process, the method comprising:

extruding a paste formed from a polytetrafluoroethylene resin and a lubricant at a reduction ratio of less than 100 to thereby produce an extruded paste at a relatively low extrusion pressure;

calendering the extrudate;

removing the lubricant from the calendered extrudate;

concurrently heating and expanding the calendered extrudate, and wherein the heating step further comprises, heating the thus calendered extrudate to a temperature greater than the crystalline melting point of polytetrafluoroethylene but below its thermal decomposition temperature for a time period sufficient to substantially equilibrate the temperature of the extrudate while expanding the extrudate, but short enough to prevent substantial decomposition of the polytetrafluoroethylene, and wherein the expanding step further comprises, concurrently expanding the extrudate during heating at a fixed rate of expansion and to at least twice its original length; and varying the heating temperature at a constant rate of expansion to control the porosity and deformability of the resulting polytetrafluoroethylene.

2. A process according to claim 1 wherein the step of heating the extrudate to a temperature above the crystalline melting point of polytetrafluoroethylene comprises heating the extrudate to a temperature greater than about 320° C.

3. A process according to claim 1 wherein the step of heating the extrudate to a temperature below its thermal decomposition temperature comprises heating the extrudate to a temperature at which the extrudate shows substantially no weight loss for a period of at least about one hour.

4. A process according to claim 1 wherein the step of heating the extrudate to a temperature below its thermal decomposition temperature comprises heating the extrudate to a temperature no greater than about 430° C.

5. A process according to claim 1 wherein the step of heating the extrudate to a temperature below its thermal decomposition temperature comprises heating the extrudate to a temperature no greater than about 400° C.

6. A process according to claim 1 further comprising the step of shaping the extrudate following the step of calendering the extrudate and preceding the step of removing the lubricant.

7. A process according to claim 1 wherein the step of removing the lubricant comprises heating the extrudate to remove the lubricant.

8. A process according to claim 1 and further comprising the steps of:
preparing a paste from a polytetrafluoroethylene resin and a lubricant prior to the step of extruding the paste through an extrusion die; and
cooling the resulting product after the step of varying the heating temperature at a constant rate of expansion.

9. A process according to claim 8 wherein the step of heating the calendered extrudate to remove the lubricant comprises heating the extrudate to a temperature of about 300° C. for a time period sufficient for the lubricant to substantially evaporate from the extrudate.

10. A process according to claim 8 wherein the step of heating the extrudate to a temperature above the crystalline melting point of polytetrafluoroethylene comprises heating the extrudate to a temperature of about 360° C. for a period of about 10 minutes.

11. A process according to claim 8 wherein the step of heating the extrudate to a temperature above the crystalline melting point of polytetrafluoroethylene comprises heating the extrudate to a temperature greater than about 327° C.

12. A process according to claim 8 wherein the step of heating the extrudate to a temperature above the crystalline melting point of polytetrafluoroethylene comprises heating the extrudate to a temperature of between about 350° and 400° C.

13. A process according to claim 8 wherein the step of heating the extrudate to a temperature greater than the crystalline melting point of polytetrafluoroethylene but below its thermal decomposition temperature while concurrently expanding the heating extrudate to at least twice its original length comprises heating the extrudate while concurrently expanding to produce a product having a matrix tensile strength of between about 4000 and 6800 pounds per square inch and a density of between about 0.45 and 0.55 grams per cubic centimeter.

14. A process according to claim 8 wherein the step of concurrently expanding the heated extrudate to at least twice its original length comprises transferring a portion of the heated extrudate between two rotating drums.

15. A process according to claim 8 wherein the step of concurrently expanding the heated extrudate to at least twice its original length comprises transferring a portion of the heated extrudate from the circumference of a first rotating drum to the circumference of a second rotating drum that has a circumference larger than the circumference of the first rotating drum.

16. A process according to claim 15 wherein the diameter of the second rotating drum is twice the diameter of the first rotating drum.

17. A process according to claim 8 wherein the step of concurrently expanding the heated extrudate to at least twice its original length comprises transferring a portion of the heated extrudate from a first rotating drum to a second rotating drum while the second drum is rotating faster than the first drum.

18. A process according to claim 8 wherein the step of concurrently expanding the heated extrudate to at least twice its original length comprises expanding the heated extrudate to at least four times its original length.

19. A process according to claim 8 wherein the step of heating the extrudate while concurrently expanding the heated extrudate comprises passing the extrudate through an expansion oven in a substantially continuous fashion while heating the extrudate to a temperature at which the temperature of the extrudate substantially equilibrates in the period during which the extrudate passes through the expansion oven.

* * * * *

UNITED STATES PATENT AND TRADEMARK OFFICE
CERTIFICATE OF CORRECTION

PATENT NO. : 5,098,625
DATED : March 24, 1992
INVENTOR(S) : Huang et al.

It is certified that error appears in the above-identified patent and that said Letters Patent is hereby corrected as shown below:

At column 1, line 11, delete "polytetrafluorethylene" and insert --polytetrafluoroethylene--.

At column 9, line 10, delete "PFTE" and insert --PTFE--.

At column 9, line 25, delete "PFTE" and insert --PTFE--.

Signed and Sealed this

Thirty-first Day of August, 1993

*Attest:*

BRUCE LEHMAN

*Attesting Officer*   *Commissioner of Patents and Trademarks*